Aug. 4, 1925.
W. J. MULLALLY
1,548,376
EXCAVATING BUCKET BAIL EAR PROTECTOR
Filed Sept. 5, 1924
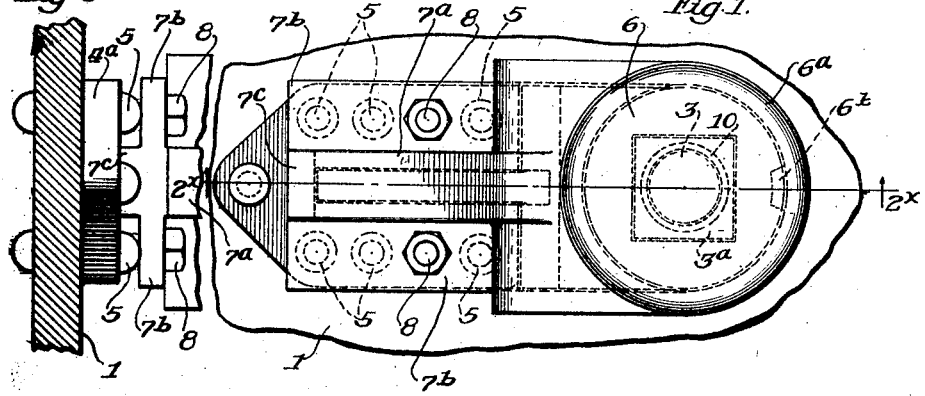
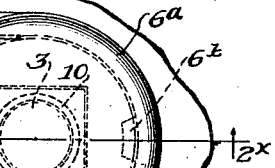
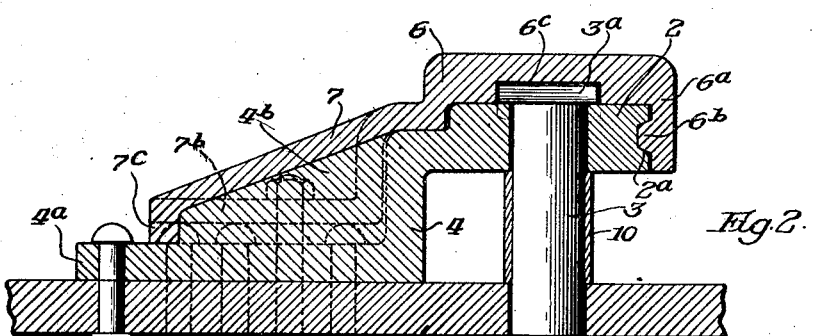
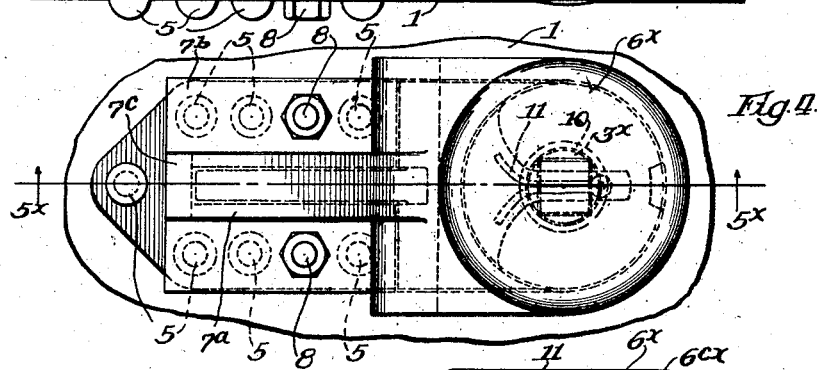
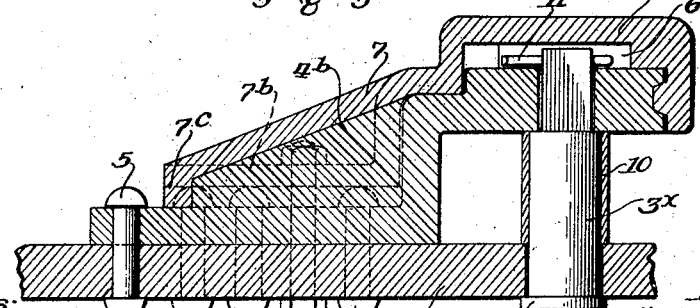
Witness:
Inventor:
Walter J. Mullally Patented Aug. 4, 1925.

1,548,376

UNITED STATES PATENT OFFICE.

WALTER J. MULLALLY, OF CHICAGO HEIGHTS, ILLINOIS, ASSIGNOR TO AMERICAN MANGANESE STEEL CO., OF CHICAGO, ILLINOIS, A CORPORATION OF MAINE.

EXCAVATING-BUCKET BAIL-EAR PROTECTOR.

Application filed September 5, 1924. Serial No. 735,980.

*To all whom it may concern:*

Be it known that I, WALTER J. MULLALLY, a citizen of the United States, residing at Chicago Heights, in the county of Cook and State of Illinois, have invented certain new and useful Improvements in Excavating-Bucket Bail-Ear Protectors, of which the following is a specification.

One object of the present invention is to provide means for protecting the bail attaching ears of excavating buckets from the destructive wear to which they are subjected in use by the the dragging of the sides of the bucket over the highly abrasive material in which such buckets are required to work; to which end, one feature of the invention consists in providing cover plates for the bail attaching ears of excavating buckets, which, while leaving the ear free to accommodate the bail pin with its securing means and to continue to serve as one confining wall for the eye of the bail, will largely or wholly prevent contact of the ear with external objects or material and thereby do away with a serious source of expense in maintenance of excavating apparatus of this kind.

Another object of the invention is to provide a protector for bail attaching ears of the bracket type, to which end a further feature of the invention consists in providing the cover plate with an attaching bracket conforming more or less closely to the general design of the attaching bracket of the ear, with the advantage of lending protection to the bail ear bracket as well as the bail ear itself, and to the rivets and other means to which the bail ear bracket is attached to the excavating bucket.

Still another object is to provide a design of protector for bail attaching ears and their attaching brackets, which can be secured in place by the use of some of the elements used for attaching the ear bracket to the bucket which, when so attached, will, by reason of the design of the attaching base of the protector, enter into more secure assembly with the bail ear and its bracket; a subsidiary feature of this part of the invention and one entering into the preferred embodiment of the invention, consisting of means for interlocking the free end of the protector plate, with the end of the bail ear in a manner to resist forces that might otherwise deflect the free end of the protector from its intended position relative to the bail ear.

Referring to the accompanying drawings in which the preferred embodiment of the invention is shown by way of illustration, Figures 1, 2 and 3 are, respectively, a side elevation, a longitudinal section on the line $2^x$—$2^x$ of Figure 1, and an elevational view of the lower end of a protector embodying the several features of the invention, together with a bail ear and bracket and a fragment of a bucket wall with which the protector is associated.

Figures 4 and 5 are views corresponding respectively, to Figures 1 and 2, a section of Figure 5 being on the line $5^x$—$5^x$ of Figure 4, showing an embodiment of the invention modified appropriately to a method of securing the bail pin, which is different from that illustrated in Figures 1 and 2.

1 represents a fragment of the wall of an excavating implement such as a bucket, dipper, drag-line scraper or the like, which is herein referred to as an excavating bucket; and 2 represents an attaching ear which, together with the bucket wall 1, supports a bail pin 3 and provides, with said bucket wall, a confining space for the eye of the bail or equivalent attachment, through means of which the bucket is supported and drawn to its work. Ear 2 is commonly secured to the bucket 1 by means of a bracket 4 or other suitable offsetting structure, which bracket, is commonly attached to the wall 1 of the bucket, by rivets 5 or equivalent securing means which must be employed in considerable numbers to resist shearing strains imposed upon them in use and which therefore involve a considerable item of expense in addition to the cost of the bail ear bracket, when it becomes necessary to replace the worn out bracket with a new one, and this is frequently incurred incident to the use of excavating implements of this kind because of the unavoidable contact of the bail supporting ears with rock, gravel or other highly abrasive material passed and in contact with which the ears must be dragged when the implement is in use.

Now the present invention largely eliminates the replacement expense incident to the use of bail ear brackets on excavating implements, by providing for such ears and brackets, protectors 6 which are not only cheaper to make than the ears and attaching brackets, but can be secured in position very much less expensively than the ear brackets. Such a protector is preferably in the form of a cover plate conforming to and overlying those external surfaces of the ear 2 which are most subjected to destructive influences referred to, and an attaching base 7 which preferably conforms to the attaching bracket 4 of the ear. Thus if the attaching bracket 4 has a base plate $4^a$ which receives the rivets 5, and a triangular strut $4^b$ for stiffening the angular offset of the ear 2 from the base plate $4^a$, the attaching base 7 of the protector 6 will preferably have a highly stiffening rib $7^a$ as well as a bracket covering plate $7^b$ which, respectively, overlie the strut $4^b$ and the bracket plate $4^a$; and the base 7, with the ear cover 6 which it carries, is secured in position by omitting a pair of rivets from the bracket and substituting a pair of bolts 8 at such distance from the lower end of the attaching base of the protector, as will adapt the latter to offer substantial resistance against outward deflection of the ear plate 6; and to increase the resistance against such outward dipping of the protector at its free end, the lower end of the base 7 is provided with a stepping lug $7^c$ in position to bear upon the bracket plate $4^a$ between the rivets 5, while the main bearing of the base plate $7^b$ is upon the heads of the rivets 5, as shown more clearly in Figure 3. As a further security against the separation of the ear plate 6 from the ear 2, the ear plate is provided with an end flange $6^a$ formed with an interlocking lug $6^b$ which enters a recess $2^a$ in the ear 2.

The protector 6 may be made to serve the function of securing the bail pin 3 in position, to which end the head $3^a$ of the pin is located beneath the ear plate 6 and the latter is provided with a recess $6^c$ to receive said head. Moreover recess $6^c$ may be made of non-circular form so that the protector becomes the means of preventing the bail pin from turning in its bearings, thereby preventing wear of the openings in which the pin is fitted, and restricting friction to the portion of the pin between the ear and the bucket wall, which protection may easily be afforded by means of a sleeve 10.

According to the embodiment shown in Figures 4 and 5, which corresponds generally to that of Figures 1, 2 and 3, the ear plate $6^x$ is provided with a special form of recess $6^{cx}$ to accommodate a cotter pin 11 through the inserted end of the bail pin $3^x$ which has its head $3^{ax}$ toward the inside of the bucket wall 1. Portions of the constructions shown in Figures 4 and 5 not here specifically mentioned are identical with corresponding parts of Figures 1 and 2 and are similarly identified by reference characters.

I claim:

1. In combination with the bail ear of an excavating implement, a protector in position to overlie a face of said ear which is presented toward the material past which the implement is dragged in service, said protector being constructed to engage the bail ear in directions to prevent lateral displacement therefrom and having means for securing it in said position.

2. In combination with the bail ear of an excavating implement, a protector in position to overlie a face of said ear which is presented toward the material past which the implement is dragged in service, and means for securing said protector in said position comprising an attaching base carrying said ear and secured to the implement to one side of said ear; said protector being constructed to embrace the ear laterally in directions to prevent displacement of the protector from the ear.

3. A protector for the bail ear of an excavating implement comprising an ear plate adapted to overlie the ear in position to receive impingements of material past which the ear is dragged in service, and means for securing said ear plate in such position; said ear plate having a recess to receive a portion of a bail pin protruding beyond the ear.

4. A protector for the bail ear of an excavating implement comprising an ear plate adapted to overlie the ear in position to receive impingements of material past which the ear is dragged in service, and means for securing said ear plate in such position; said ear plate having a recess to receive a portion of a bail pin protruding beyond the ear; said recess being shaped to embrace the protruding portion of the pin and prevent the latter from turning.

5. A protector for the bail ear of an excavating implement comprising an ear plate adapted to overlie the ear in position to receive impingements of material past which the ear is dragged in service, and means for securing said ear plate in such position; said ear plate having a recess to receive a portion of a bail pin protruding beyond the ear; said recess having a wall which overlies the end of the pin and adapts the ear plate to resist displacement of the pin from the ear.

6. In combination with an excavating implement having a bail ear and a pin inserted through said bail ear, a protector overlying said ear in position to receive impingement of material past which the ear is dragged in service and also overlying the end of the pin and preventing withdrawal of the latter.

7. In an excavating implement a draft attachment ear having an eye to receive a pin, a pin introduced into said eye and having a head that engages the ear to limit the passage of the pin through said eye, and an ear plate applied to the external surface of said ear, overlying the head of the pin and preventing withdrawal thereof and protecting the surface of the ear and head of the pin from impingement of material past which the ear is dragged when the implement is in service.

8. A protector for draft attachment ears of excavating implements comprising an ear plate designed to overlie a surface of an ear and an attaching base carrying said ear plate, and constructed with a base plate offset from the ear plate and a highly diagonal brace which stiffens the offset between said plates and that fits the stiffening strut of an ear bracket within it.

9. In a protector for the bail ear of an excavating implement, an ear plate, a base plate extending from one side of said ear plate and having means intermediate of its length for securing it in position, and a stepping lug on said base plate, on the side of the attaching means opposite to the ear plate.

10. In a protector for bail ears of excavating implements, an ear plate adapted to overlie the ear to be protected, having an interlocking lug through which it is adapted to engage a bail ear and having an attaching base extending from the opposite side of the ear plate from said interlocking lug.

Signed at Chicago Hts., Ill., this 28th day of August, 1924.

WALTER J. MULLALLY.